Nov. 18, 1924.
B. L. LEMMER
1,516,346
CONTROLLING MECHANISM
Filed Oct. 24, 1923
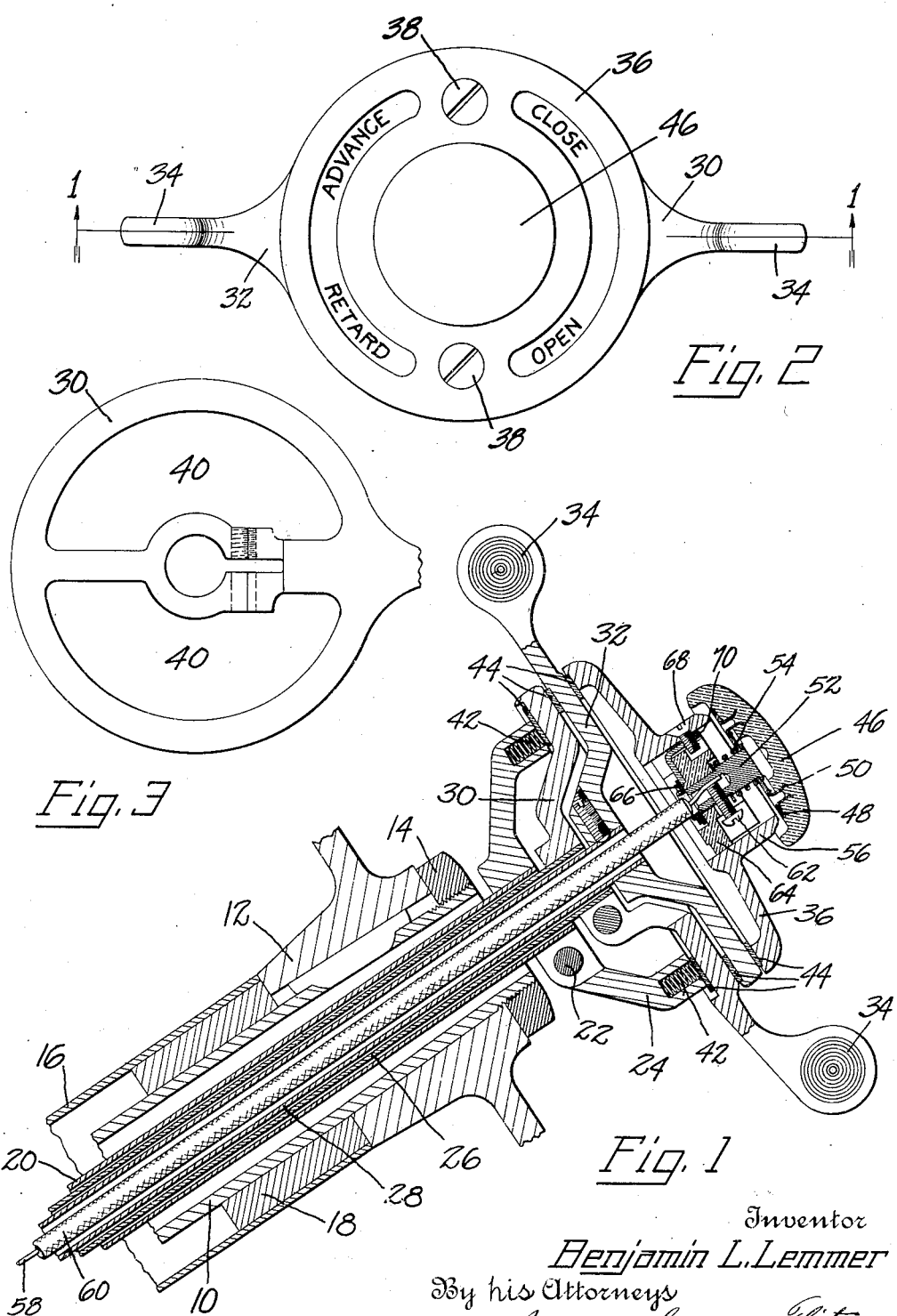
Inventor
Benjamin L. Lemmer
By his Attorneys
Blackmore, Spencer & Flint Patented Nov. 18, 1924.

1,516,346

UNITED STATES PATENT OFFICE.

BENJAMIN L. LEMMER, OF SAGINAW, MICHIGAN, ASSIGNOR TO GENERAL MOTORS CORPORATION, OF DETROIT, MICHIGAN, A CORPORATION OF DELAWARE.

CONTROLLING MECHANISM

Application filed October 24, 1923. Serial No. 670,478.

*To all whom it may concern:*

Be it known that I, BENJAMIN L. LEMMER, a citizen of the United States, and a resident of Saginaw, county of Saginaw, and State of Michigan, have invented certain new and useful Improvements in Controlling Mechanism, of which the following is a full, clear, concise, and exact description, such as will enable others skilled in the art to which the invention relates to make and use the same, reference being made therein to the accompanying drawings, which form a part of this specification.

This invention relates to controlling mechanism such as is commonly used for the spark and throttle of a motor vehicle, and is illustrated as embodied in mechanism of this character supported by the steering column and forming a part of the steering assembly.

An object of the invention is to provide an inexpensive and efficient arrangement of the parts of this mechanism which will be neat in appearance and which will obviate any necessity for ratchets and pawls or other movable parts for holding the controlling members in any desired position.

Having this object in view, the invention contemplates controlling devices, as, for example, for the spark and throttle, including a pair of superimposed friction disks arranged for manual operation and which are supported above and within the circumference of the steering wheel. In one desirable arrangement, these disks are compressed between a pair of stationary plates, which may be supported by a stationary tube arranged inside of the usual steering tube, and, if desired, springs may be added for holding the disks yieldingly but firmly in frictional engagement with each other and with said plates so that they will be held frictionally in any desired angular position. I find it convenient to utilize the upper supporting plate as a base for the horn button or an equivalent electric switch.

The above and other objects and features of the invention, including various novel combinations of parts and desirable particular constructions, will be apparent from the following description of one illustrative embodiment shown in the accompanying drawings, in which—

Fig. 1 is a view in vertical section through the steering column assembly;

Fig. 2 is a top plan view of the parts of the controlling mechanism; and

Fig. 3 is a plan view of one of the friction disks.

In the form selected for illustration, the steering column assembly comprises a steering tube 10 keyed at its upper end to the hub 12 of a steering wheel held by a lock nut 14 and the steering tube being preferably inclosed in an outer stationary protecting tube 16 spaced therefrom by a bearing sleeve 18. Inside of the steering tube 10 is arranged a stationary supporting tube 20 to which is secured, as, for example, by a clamp screw 22, a lower supporting plate 24 and within which are arranged coaxial controlling tubes 26 and 28. At the upper end of the controlling tube 26 there is clamped a disk 30 of skeleton form, shown in plan in Fig. 3 and which is illustrated as being arranged for controlling the throttle of the engine. At the upper end of the tube 28 is secured a similar controlling disk 32, which is illustrated as being arranged for controlling the spark. Each of the disks is provided with a knurled finger-piece 34. Above the friction disks 30 and 32 there is stationarily supported a supporting plate 36, shown as being a die-casting and which is held by screws 38 passing through openings 40 in the friction disks into threaded recesses in the lower plate 24.

In order to hold the disks 30 and 32 frictionally in engagement with each other and with the plate 36, the lower plate 24 is provided with an angularly spaced series of sockets, each of which contains a small coiled spring 42, which springs urge the disks together and against the plate 36. I prefer to provide gaskets 44 of friction material.

I find it convenient to utilize the upper supporting plate 36 as the base or support for a horn button or equivalent electric switch.

In the illustrated arrangement, the operating member 46 is formed of any suitable insulating material carrying a stamped contact plate 48 having prongs 50 bent upward and embedded in the insulating material. The stamping 48 is provided with a central opening to have sliding engagement with a central conducting member 52 to be depressed against the resistance of a spring 54 to bring the stamping 48 into engagement with the edge of a central boss 56 formed on the plate 36 to ground the horn circuit through the screws 38 and the metal parts of the steering column assembly. The wire 58 from the horn is provided with suitable insulation 60 and leads upwardly through the tube 28, with its upper end held by a binding screw 62 in electrical contact with the member 52. The member 52 is formed with an external shoulder engaging a washer which is seated against the upper surface of a block 64 of insulating material which is held in place by spinning the bottom of member 52 outwardly over insulating washers 66. The block 64 is secured to the stationary plate 36 by a set screw 68 threaded into a metal stamping 70 embedded in the insulating material of the block. By this arrangement it will be seen that the stamping 48 is constantly in electrical communication with the wire 58 from the horn and when it is grounded against the top of the boss 56 will act to close the horn circuit.

While one illustrative embodiment of my invention has been described in detail, it is not my intention to limit its scope to that embodiment or otherwise than by the terms of the appended claims.

I claim:

1. A steering column comprising, in combination, a manually rotatable steering tube, a pair of independently rotatable concentric tubes nested inside of the steering tube and one of which is nested inside of the other, a throttle controlling disk secured to the top of one of said tubes, a spark controlling disk secured to the top of the other of said tubes, said disks frictionally engaging one another, stationary supports on opposite sides of the disks, and springs engaging one of the supports and urging both of the disks against each other and against the other support to hold them frictionally in any desired angular position.

2. A steering column comprising, in combination, a manually rotatable steering tube, a coaxial stationary supporting tube having a stationary plate at its upper end and arranged inside of the steering tube, coaxial controlling tubes arranged within one another and within the stationary supporting tube, a rotatable throttle controlling disk secured to the top of one of the controlling tubes and a rotatable spark controlling disk secured to the top of the other of the controlling tubes, said disks and the supporting plate being arranged in superimposed relation, a second supporting plate above the disks, and springs arranged in one of the supporting plates to urge the disks against each other and against the other supporting plate to hold the disks frictionally in any desired angular position.

3. A steering column comprising, in combination, a manually rotatable steering tube, a stationary supporting tube inside of the steering tube and having a supporting plate at its upper end, a pair of rotatable controlling tubes nested within one another and within the supporting tube, a skeleton disk secured to the top of each controlling tube and arranged for manual operation, the disks and the supporting plate being arranged in superimposed relation, a second supporting plate above the disks arranged to hold the disks in frictional engagement with each other and the two supporting plates, and fasteners for the second supporting plate passing through relatively large openings in the skeleton disks to secure the plate to the lower supporting plate.

4. A steering column comprising, in combination, a steering tube having a manually-rotatable steering wheel at its upper end, a tube within the steering tube, a cup-shaped member secured to the top of the inside tube and formed with a generally cylindrical upwardly-projecting flange coaxial with the tubes, the member having upwardly-opening recesses in the flange, springs in said recesses, and angularly-movable control members above the cup-shaped member which are pressed into engagement with one another by said springs.

In testimony whereof I affix my signature.

BENJ. L. LEMMER.